United States Patent
Reid et al.

(10) Patent No.: US 6,457,570 B2
(45) Date of Patent: *Oct. 1, 2002

(54) RECTANGULAR BURSTING ENERGY ABSORBER

(75) Inventors: John D. Reid; John R. Rohde; Dean L. Sicking, all of Lincoln, NE (US)

(73) Assignee: Safety By Design Company, Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/935,949

(22) Filed: Aug. 23, 2001

Related U.S. Application Data (63) Continuation-in-part of application No. 09/307,235, filed on May 7, 1999, now Pat. No. 6,308,809.
(60) Provisional application No. 60/232,465, filed on Sep. 13, 2000.

(51) Int. Cl.[7] .................................................. F16F 7/12
(52) U.S. Cl. ......................................................... 188/377
(58) Field of Search ................................ 188/374, 376, 188/377; 74/492; 293/133

(56) References Cited

U.S. PATENT DOCUMENTS

| | | | | |
|---|---|---|---|---|
| 3,143,321 A | * | 8/1964 | McGehee et al. | 188/376 |
| 3,608,677 A | * | 9/1971 | Wykes | 188/376 |
| 3,744,338 A | * | 7/1973 | Komatsu et al. | 74/492 |
| 3,916,720 A | * | 11/1975 | Smith | 188/374 |
| 4,336,868 A | * | 6/1982 | Wilson et al. | 188/376 |
| 5,181,589 A | * | 1/1993 | Siegner et al. | 188/374 |
| 5,351,791 A | * | 10/1994 | Rosenzweig | 188/374 |
| 5,732,801 A | * | 3/1998 | Gertz | 293/133 |
| 5,875,875 A | * | 3/1999 | Knotts | 188/374 |
| 6,308,809 B1 | * | 10/2001 | Reid et al. | 188/377 |

* cited by examiner

Primary Examiner—Christopher P. Schwartz
(74) Attorney, Agent, or Firm—Jackson Walker L.L.P.

(57) ABSTRACT

A bursting energy absorber system having an impact head, and energy absorption mechanism. The energy absorbing mechanism has a generally rectangular mandrel for rupturing cooperating thin-walled generally rectangular tubes in a controlled rupture to absorb impact forces for a colliding vehicle. A frame may be used to mount the system to a truck, trailer, guardrail, median barrier end treatment, or a crash cushion. Stress concentrators such as saw cuts or scoring may be incorporated into the absorption tubes to selectively control rupturing and energy dissipation. The mandrels may be tapered, rectangularly shaped with beveled edges to reduce frictional forces along the interior comers of the tubes. Lubricants may be applied to further control frictional influences.

19 Claims, 5 Drawing Sheets

RECTANGULAR BURSTING ENERGY ABSORBER

This is a continuation-in-part application based upon U.S. patent application Ser. No. 09/307,235, filed May 7, 1999 now U.S. Pat. No. 6,308,809. Further, this application claims priority to U.S. Provisional Patent application Ser. No. 60/232,465, filed Sep. 13, 2000.

BACKGROUND OF THE INVENTION

The present invention relates to a traffic crash attenuation system. More particularly, the present invention includes a system, method and apparatus for absorbing the kinetic energy from an impacting vehicle in a controlled and safe manner with roadside safety devices such as: guardrails and median barrier end treatments, crash cushions, and truck mounted attenuators. Specifically, the present invention provides a system for the controlled rupturing of a tubular member by a mandrel whereby forces of an impacting vehicle are absorbed. More particularly, the present inventive system utilizes a rectangular mandrel and a corresponding rectangular tubular member.

U.S. Pat. No. 4,200,310 illustrates an energy absorbing system which utilizes a number of cylindrical energy absorbing members placed in a series-type relationship on a frame mounted to a truck. The system is provided with an alignment or guidance frame. However, there is nothing, which teaches any selectively controlling the rupture of the cylindrical members. The mechanism of energy dissipation is significantly different than that of the present invention.

U.S. Pat. No. 3,143,321, teaches the use of a frangible tube for energy dissipation. As with the present invention, the apparatus disclosed in U.S. Pat. No. 3,143,321 uses a mandrel receivable within a tubular member. However, there is no teaching of a means for selectively controlling the rupturing along a length of the tubular member.

SUMMARY OF THE INVENTION

The crash attenuation system of the present invention provides an impact head attached to an energy absorption mechanism. The energy absorption mechanism has one or more mandrels with a certain tensile strength or hardness attached to the impact head. Attached to the head are one or more tubular members which have second tensile strengths or hardnesses, generally lower than those of the mandrels. The mandrels are receivable in a first end of the tubular members such that upon impact forces being applied to the impact head, the mandrels are forced through the tubular members rupturing, rather than fragmenting, the tubular members and absorbing the impact forces. The rupturing may be controlled by any number or combination of stress concentrating elements such as placing holes, notches, cuts, scores, preferential material orientation, or slots in the tubular members, providing gussets (or any strengthening member) along the length of the tubular members, or providing the mandrels with stress concentrators such as gussets or mandrel geometry so that as the mandrels are urged through the tube the rupturing is controlled. Specifically, the present invention focuses on rectangular mandrel and rupture tube geometry.

DETAILED DESCRIPTION OF THE PREFERRED EMBODIMENT

Figure 1A:
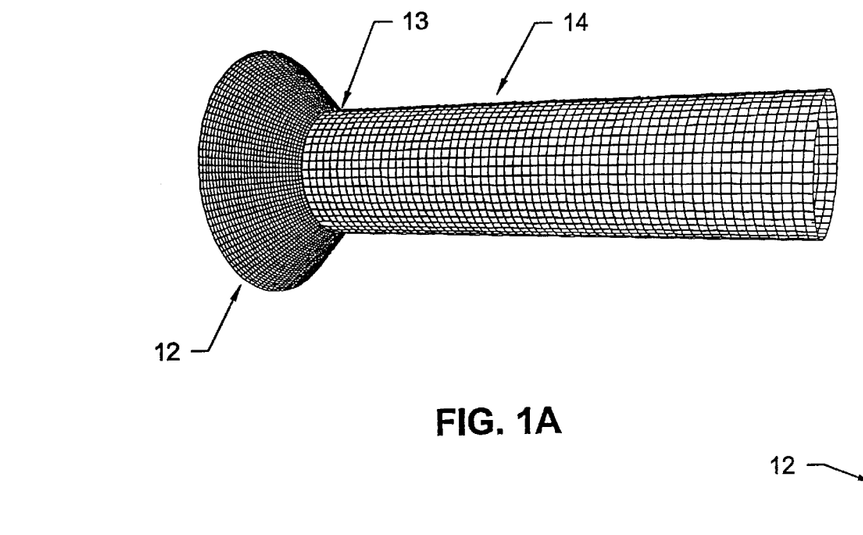
FIG. 1A is an isometric view of a mandrel and tubular member of the present invention before impact forces are applied.
Figure 1B:
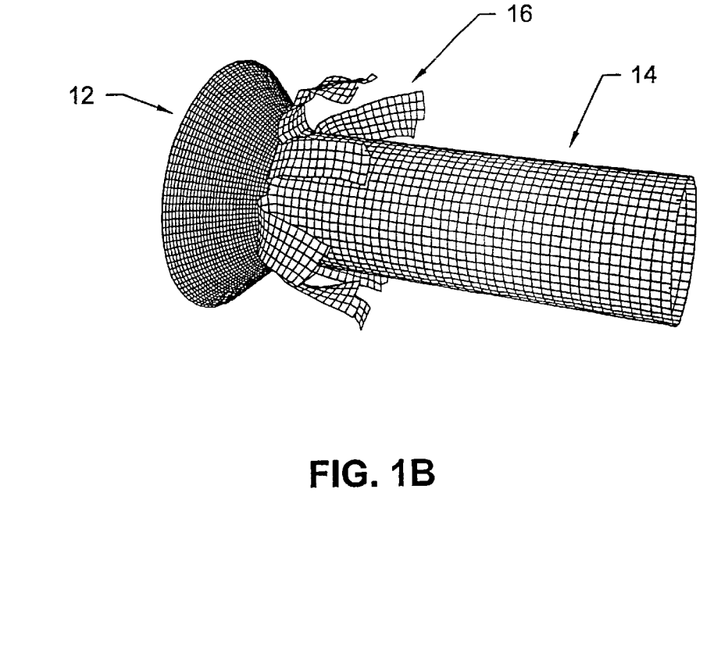
FIG. 1B illustrates the rupturing of the tubular member by the mandrel upon impact.

The controlled fracture or rupturing mechanism of the present invention is based on the concept that, when an over-sized plunger with a tapered surface (mandrel 12) is forced into a thin-wall tubing 14 of the generally same shape, pressure is exerted on the edge of the tubing from the inside, as illustrated in FIGS. 1A and 1B. The pressure initially expands the size of the thin-wall tubing, first elastically until the yielding strength of the metal is reached and then plastically. The tubing eventually fractures or ruptures 16 at the edge when the ultimate tensile capacity of the material is exceeded. This process of expanding and fracturing the thin-wall tubing 14 is repeated and energy dissipated as the mandrel 12 proceeds forward. This process can be applied to tubes manufactured from a variety of materials, including, but not limited to, steel, aluminum, fiber reinforced plastic (FRP), polymers such as high density polyethylene, and concrete or other ceramics.

Although this concept may be used with both brittle materials and ductile materials, brittle materials, such as frangible aluminum, ceramics, or concrete, fragment during the process and produce shrapnel that could pose a hazard to nearby traffic or pedestrians. Therefore, the present invention anticipates the use of ductile materials or brittle materials which are appropriately coated so as not to produce shrapnel-like fragments. Ductile materials, such as steel, polymers, or FRP materials with longitudinal reinforcement, tear into a number of longitudinal strips that remain attached to the undeformed portions of the tubular energy absorber.

The amount and rate of energy dissipation can be controlled by varying the shape, size, thickness, and strength of the thin-wall tubing 14 and the number of tubes. The location and required force level of the rupture can be controlled by incorporating stress concentrators on the tubing, using holes 17, slots 18, notches, cuts, scores and strengtheners such as gussets 19, shown in FIGS. 3A and 4A, or on the mandrel 12, using raised edges 30 as shown in FIG. 2C, or varying the geometrical shape of the mandrel. Further stress concentrators may include the use of preferential material orientation such as fiber alignment in fiber reinforced plastics or cold rolling of metals to produce elongated grain boundaries.

Figure 2A:
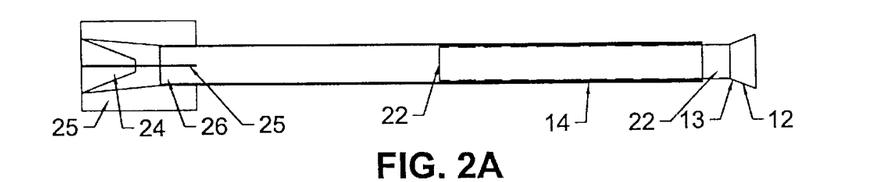
FIG. 2A is a side elevation view of an embodiment of the present invention having a mandrel with a forward tubular extension and a tubular member with a second mandrel.
Figure 2B:
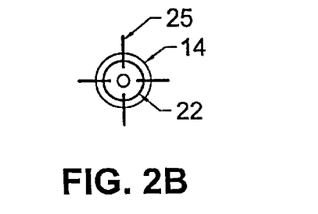
FIG. 2B is an end view of the illustration of FIG. 2A.
Figure 2C:
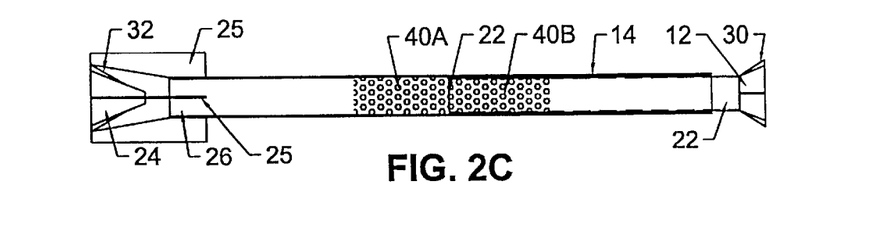
FIG. 2C is a side elevation view of an embodiment of the present invention with the first and second mandrels having stress concentrators.
Figure 2D:
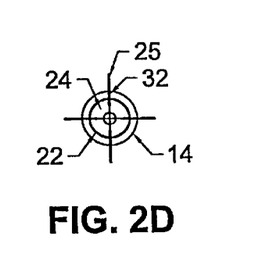
FIG. 2D is an end view of the illustration of FIG. 2C.

FIG. 2A shows a two-stage splitting system that involves splitting first one tube 14 and then another 22. The first tube 14 is attached to a roadside safety device (not shown). Initially upon impact of a vehicle with an impact head (not shown in FIG. 2A), the hollow tube extension 22 on mandrel 12 on the right is pushed into the outer tube 14. The mandrel 12 engages outer tube 14, causing it to split or rupture as illustrated in FIG. 1. After further displacement, the hollow tube extension 22 contacts a second, conical shaped mandrel 24 on the far end 26 of the outer tube 14 and is itself split. Each rupturing allows for controlled absorption of impact energy. Mandrel 24 is supported to outer tube 14 by gussets 25.

FIG. 2C illustrates a two stage system with gusset plates or raised edges 30 and 32 extending outward from the mandrels 12 and 24, respectively. These gusset plates 30 and 32 illustrate an example of a stress concentrator placed on the outer tube. The tubes may be provided with slots or strengthening members to control the rupturing process.

In addition, the controlled fracturing mechanism can be used in combination with other means of energy dissipation. Energy absorbing materials 40A and 40B (FIG. 2C) (e.g., aluminum honeycomb or composite tube, etc.) can also be placed inside of the tubes to increase the energy dissipation capacity as shown in FIG. 2C.

For end-on impacts, the vehicle will contact the impact plate 50,.i.e., end of the impact head, and push it forward. This in turn will push the mandrel forward into the thin-wall tubing and start the process of expanding and fracturing/bursting of the tubing. This process will continue until: (a) the impacting vehicle is brought to a safe and controlled stop; (b) the entire length of the tubing is fractured; or (c) the impacting vehicle yaws out and disengages from the impact head.

For impacts that are end-on at a large angle, the impacting vehicle will initiate the controlled fracturing/bursting process until the thin-wall tubing is bent out of the way or the mandrel disengages from the thin-wall tubing, and then gate behind the device. Similarly, the impacts on the side of the thin-wall tubing 14 near the end of the device cause the thin-wall tubing will be bent out of the way, allowing the vehicle to gate behind the device. Thus, when struck on the corner, either on the end or the side of the cushion, the energy absorbing mechanism begins to collapse longitudinally providing lateral resistance as it begins to bend out of the way.

For impacts into the side of the thin-wall tubing downstream of the beginning of length-of-need, the thin-wall tubing will act like a barrier and contain and redirect the impacting vehicle. An anchoring mechanism will be necessary to resist the tensile forces acting on the tubing to contain and redirect the vehicle. Note that this requirement of containment and redirection is applicable only for devices that have redirective capability, such as a terminal or a redirective crash cushion.

Figure 3A:
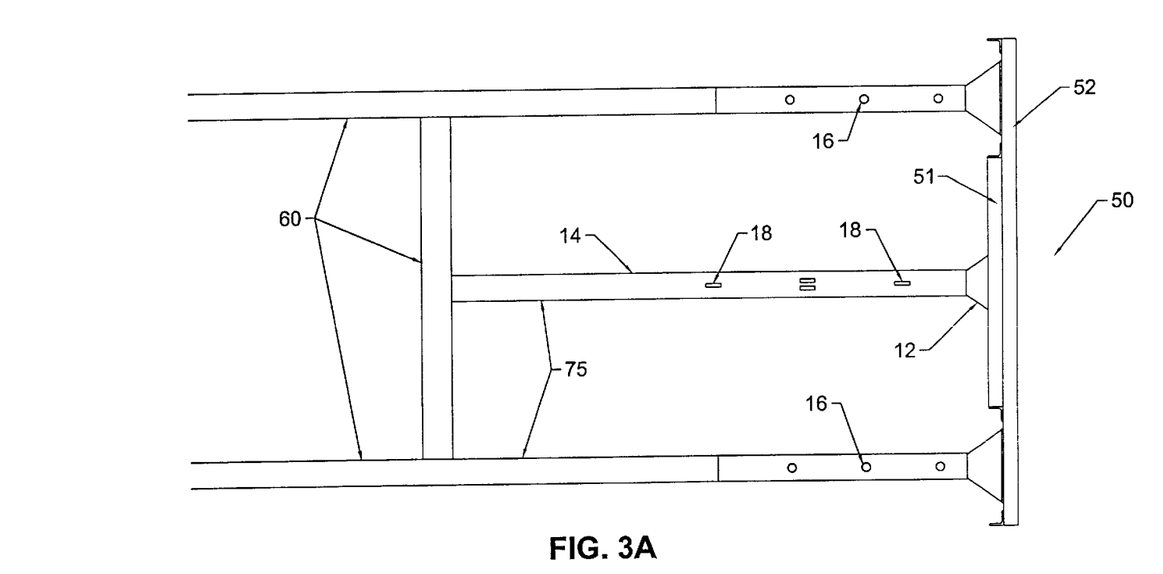
FIG. 3A shows a top plan view of the present invention with the controlled fracture energy absorbers attached to the impact head and trailer or truck mounted frame elements.
Figure 4A:
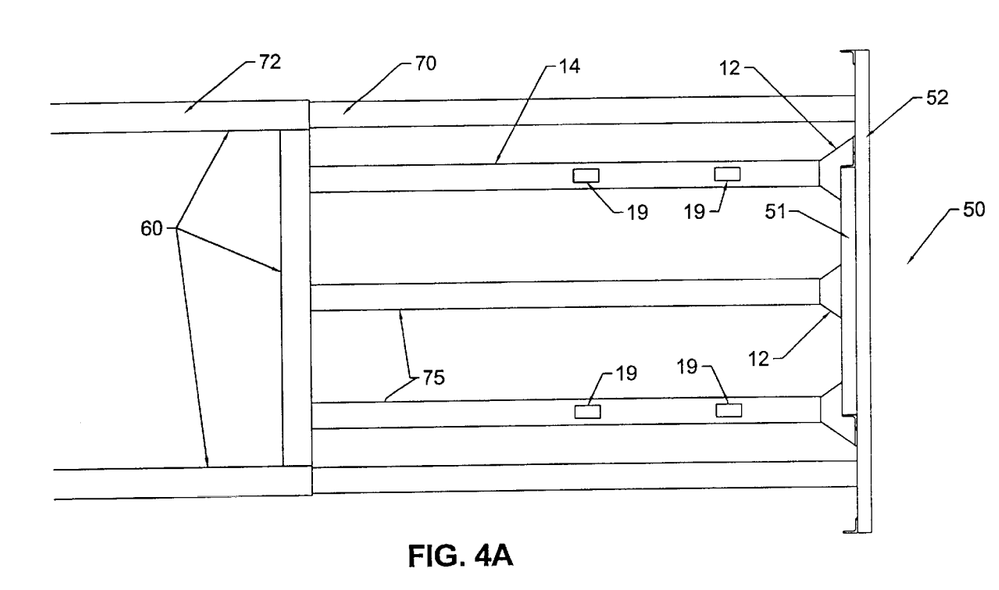
FIG. 4A shows a top plan view of the present invention with an alignment member attached to the trailer or truck mounted frame.

A roadside safety device utilizing the controlled fracture mechanism consists of a few major components, as illustrated in FIGS. 3A and 4A. Thin-wall tubing 14 is utilized. The tubing may have a circular, square, or rectangular cross-section. The edge of the front end of the tubing (i.e., the end into which the mandrel is attached) may have notches or slots to control the location(s) of the fracture for the tubing. The tubing may also have longitudinal slots cut along portions of its length to control the rate of energy dissipation.

Figure 3B:
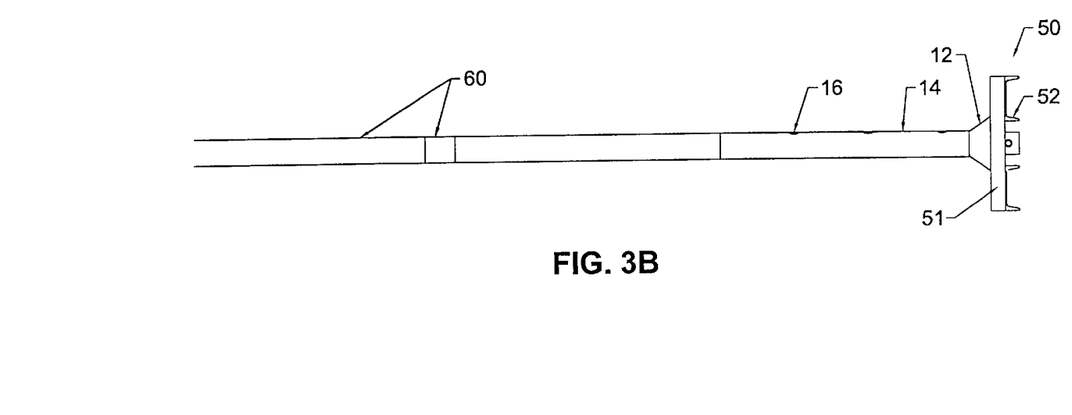
FIG. 3B is a side elevation view of the illustration of FIG. 3A.
Figure 4B:
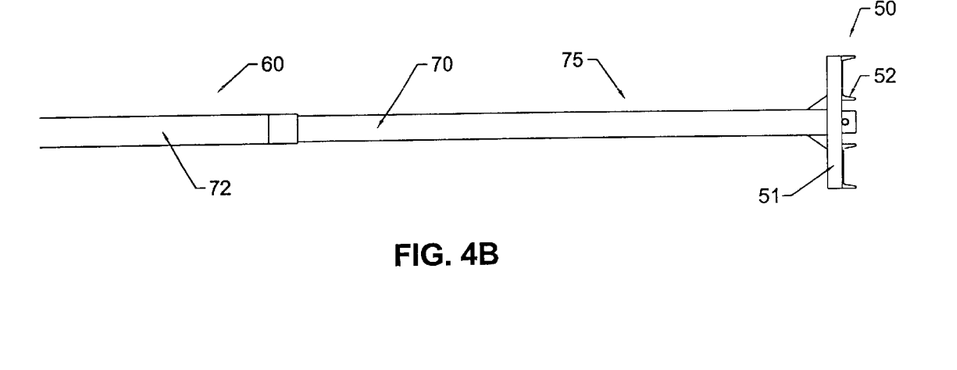
FIG. 4B is a side elevation view of the illustration of FIG. 3C.

An impact head/plate 50 is provided. Details of the impact head/plate are shown in FIGS. 3B and 4B. The impact head 50 consists of an impact plate 51; a means to provide mechanical interlock 52 between the impact head and the front of the impacting vehicle, such as raised edges around the impact plate 50; and a mandrel 12 welded to the back of the impact plate 50.

The mandrel 12 is much stronger (having a greater tensile strength, a greater thickness, or greater hardness) than the splitting tube 14 to prevent the mandrel from deforming. The mandrel 12 need not have the same cross-sectional shape as the thin-wall tubing, however, there must be only small clearances between the mandrel and the tubing in order to prevent misalignment. For example, channel or wide flange shapes could be used with rectangular frame rail elements as long as the height and depth of the open sections were close to the same as the clear opening in the tube. The head 13 of the mandrel 12 is tapered so that only the leading portion of the mandrel head 13 initially will fit into the thin-wall tubing. The mandrel 12 may have stress concentrators, e.g., a particular geometrical shape or raised edges, to control where the thin-wall tubing will fracture. For square or rectangular tubes, the mandrel may have a corresponding square or rectangular shape that flares outward. This type of tube/mandrel combination, as discussed below in relation to FIGS. 5A and 5B, assures that the tube splits at the corners where strain hardening during manufacturing has made the metal less ductile.

As mentioned previously, the controlled fracture mechanism of the present invention may be used in combination with other forms of energy dissipation. One such design (FIG. 2C) may include the placement of some form of energy absorbing material 40A and 40B, such as aluminum honeycomb or composite tube inside the thin-wall tubing. As the mandrel proceeds forward, the mandrel will fracture the thin-wall tubing as well as crush or compress the energy absorbing material inside the tubing for additional energy absorption.

A composite tube trailer or truck mounted attenuator utilizes a crushable composite beam as its primary energy dissipation mechanism. There are two embodiments of this device, shown in FIGS. 3A and 4A. One embodiment, shown in FIG. 4A, uses telescoping frame rail elements 70 and 72 to maintain lateral stability and alignment for the attenuator and utilizes the controlled fracture concept with composite tubes to provide the energy dissipation. Frame 60 is mounted to the trailer or truck to support the head 50 and energy absorption mechanism 75. It is envisioned that cables or thin steel straps (not shown) may be used to brace the frame 60. Cables may be attached to the back of the frame on one side and to the front of the frame on the other side to prevent lateral "racking"of the frame system.

Another embodiment utilizes controlled fracture frame rail elements in addition to composite tube energy absorbers as shown in FIG. 3A. The present invention may have energy absorbers placed inside of the telescoping tubes or outside.

As previously stated, the tube bursting energy absorber works on the principal that the energy associated with the propagation of cracks along the length of a tube can be carefully controlled and utilized to dissipate the energy of an impacting vehicle. This invention incorporates a tapered mandrel that is forced inside an energy absorbing tube of slightly smaller dimensions. As the tapered mandrel is forced inside the tube, hoop stresses develop in the energy absorbing tube and these stresses are then used to propagate cracks along the length of the tube. The cracks propagate in front of the mandrel such that there is no direct contact between the mandrel and the crack surfaces, thereby limiting friction. The system's operation is somewhat different when incorporated for round and square energy absorbing tubes.

Although a number of energy absorbing systems utilized collapsing round tubes, none of the prior inventions have incorporated square tubes. The corners of square tubes make these energy absorbers perform much differently than round tubes. Because square tubes have rounded corners, a tapered square mandrel forced inside a square tube will tend to contact the tube only in the vicinity of the corners. Although such a system would eventually produce ruptures in the corners of the tube, the sharp corners of the mandrel would contact the crack surfaces and high friction forces would be generated.

Figure 5A:
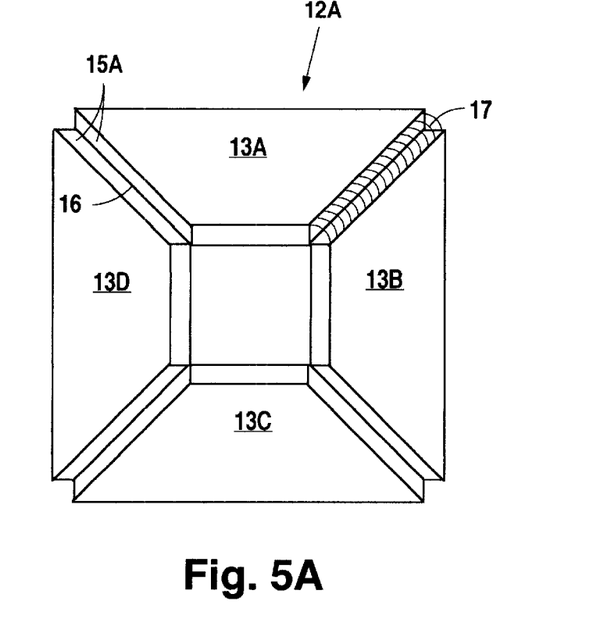
FIG. 5A illustrates the rectangular mandrel of the present invention.
Figure 5B:
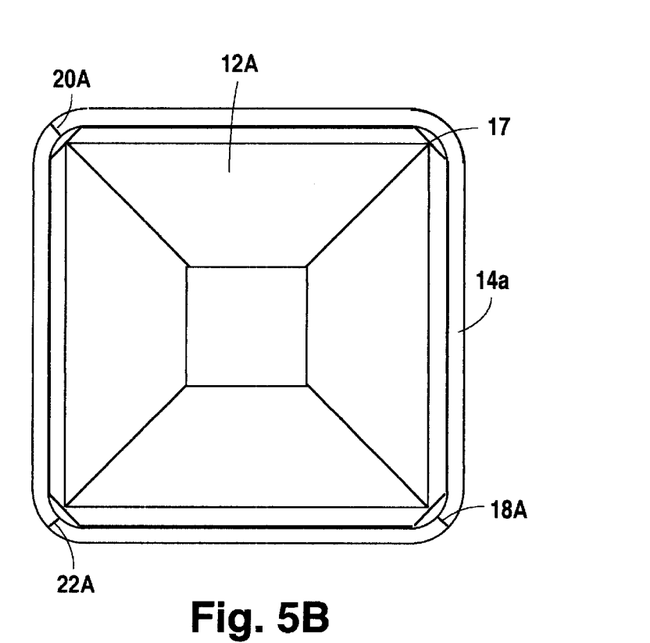
FIG. 5B shows the rectangular tubular member of the present invention.

The tube bursting energy absorber avoids this situation by using a tapered mandrel with bevels at each corner. As shown in FIG. 5A, the preferred mandrel 12A for square tubes 14A (FIG. 5B) involves welding four steel plates (13a, 13b, 13c, and 13d) together to form a pyramid. The interior edges of the plates are placed together and the valley 16 is fillet welded to form a relatively flat, beveled surface 17 at each corner (only one corner is shown in FIG. 5A with the flat, beveled surface 17). As shown in FIG. 5B, this configuration allows the mandrel 12A to contact the square tube 14A everywhere but the rounded corners 18A. As the tube is pushed onto the mandrel, the rounded corners will be placed in tension and straightened out. As this happens, stress concentrations where the tube walls bend around the beveled edges of the mandrel will initiate cracks. These cracks will then propagate in front of the mandrel 12A to produce a controlled energy absorbing system. The mandrel will not contact the crack surfaces and therefore friction between the mandrel and the energy absorbing tube is minimized.

Because there are two crack initiators at each corner, two cracks can start and propagate simultaneously. Normally only one of these two cracks will dominate and the other crack will stop propagating. However, when this occurs, one side of the tube is actually a very shallow channel shape, which tends to dissipate more energy when the cracked walls are curled back. Saw cut manufactured cracks placed in the center of each corner can force the crack to run down the center of the tube corner. Thus, initial manufactured cracks can lower the energy dissipation associated with square tubes to some extent.

The energy dissipation rate for this system is controlled by a number of factors, including the thickness of the energy absorbing tube, bevel angle on the mandrel, lubrication applied to the inside of the energy absorbing tube, and the material used in the energy absorber. Energy is dissipated by the tube bursting energy absorber through three primary mechanisms: crack propagation, curling of the cracked sections of tube, and friction. Crack propagation energy in a square or rectangular tube is controlled primarily by the type and thickness of the material used in the energy absorbing tube. More ductile and tougher metals have higher strain energy release rates and thus dissipate more energy. Likewise, thicker tubes also absorb more energy in the crack propagation process.

Energy dissipated as the cracked sections of a rectangular tube are curled back is controlled by the taper angle of the mandrel and the thickness of the material. Higher mandrel taper angles decrease the radius of the curled sections of cracked tube and thereby increase the energy dissipated in the bending process. However, lower taper angles do increase friction slightly, thereby offsetting the decreased bending energy to some extent. Tube thickness also affects the energy required to curl the cracked sections of the tube.

Friction is the other major source of energy dissipation. Lubricants placed inside the energy absorbing tube can greatly reduce friction energy. Although conventional lubricants such as grease or oil, and other hydrocarbon compositions, can serve this purpose, other lubricants could include zinc used in the galvanizing process, paints, ceramic composition surfaces, and even rust particles.

Round tubes made from ductile materials, such as low carbon steel, will deform greatly when a tapered mandrel is driven inside. If the energy absorber does not include weakening mechanisms as described by Smith (1973), the tube will expand sufficiently to completely engulf the mandrel. In this case, the forces required to push the mandrel inside the energy absorber rise rapidly and the system is ineffective. Smith teaches that, by using a pattern of slots in the energy absorbing tube, it can be made to deform outwardly away from the mandrel and fold back upon itself. In this situation the energy absorbing forces are controlled, but the cost of producing the large numbers of slots, holes, or other weakening mechanisms is high. As described above, the tube bursting energy absorber involves propagating cracks along the length of the tube. For round tubes, these cracks must be manufactured in the end or along the side of the tube. The cracks are manufactured by placing small saw cuts at strategic points around the tube or by scoring the surface of the tube along its length. FIG. 5A shows a saw cut 20A in the center of one of the rounded corners. Optimally, saw cuts should be twice as long as the wall thickness of the energy absorbing tube. FIG. 5A shows a score 22A in the center of one of the rounded corners. Scores need only be 10–20% of the thickness of the energy absorbing tube in order to propagate the crack. Scoring refers to a shallow notch, cut, mark, or scratch down the side of the tubes. Typically, they look like little grooves down the sides of the four corners in the rectangular tube configuration. However, the scores could be placed any place along the tube to enhance or promote crack propagation and/or reduce the bursting force levels. Scores may be placed on the outside or inside of the tubes. When forced inside the energy absorbing tube, the mandrel creates high hoop stresses which will cause the cracks to grow in a opening mode.

There are two primary advantages of this system. The first advantage is that small saw cuts and/or shallow surface scores are very inexpensive to produce. The second advantage of this approach is that the cracks propagate in front of the mandrel in a manner to prevent direct contact between the mandrel and the crack tip. By keeping the mandrel out of the crack tip, friction is greatly reduced and the energy dissipation rate is controlled.

Just as in the case with the square tube, the energy dissipation rate of the absorber can be influenced by the thickness of the energy absorbing tube, bevel angle on the mandrel, lubrication applied to the inside of the energy absorbing tube, and the material used in the energy absorber. The primary difference in energy dissipation between round and square tubes is that round tubes can have a number of different crack configurations. The crack propagation energy is directly related to the number of cracks induced in the tube. The energy dissipated as the cracked sections of tube are curled back is controlled by the taper angle of the mandrel and the number of cracks induced in the tube. When more cracks are induced in the tubes, the moment of inertia of each cracked section is reduced. By reducing the section modulus, the energy required to bend each section back is reduced. Energy dissipation by round tubes is also controlled by all of the factors mentioned previously for the square tube.

For any given tube configuration, energy dissipation rates are relatively constant. However, for many safety applications it is desirable to design energy absorbers with multiple energy absorption stages. Another advantage of the tube bursting energy absorber is that multiple stages are easily implemented by nesting energy absorbing tubes of varying lengths. For example, a two-stage energy absorbing system can be set up by inserting a longer tube inside a shorter tube of larger dimension. The first stage would consist of a single tube while the second stage would consist of two nested tubes. When the mandrel reaches the nested tube, cracks will be propagated down both the inner and outer tubes and the energy dissipation increases to a higher level. The energy dissipation rate for the two combined tubes is generally less than the sum of the rate for each tube bursted separately. This decrease can be attributed to reduced friction associated with the combined bursting process.

Another means of developing a two-stage energy absorbing system is to score only the front portion of a tubular section. The scored section of the tube typically has a lower energy dissipation rate than the un-scored portion of the tube, thus forming a two-staged energy absorbing system.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. An energy absorption system comprising:
   an impact head;
   an energy absorption mechanism affixed to said head, said mechanism further comprising:
   a first mandrel; and
   a tubular member, said first mandrel receivable within a first end of said tubular member such that upon impact forces being applied to said impact head, said first mandrel is urged through said tubular member rupturing said said first mandrel is urged through said tubular member rupturing said tubular member, said rupturing controlling the dissipation of said impact forces.

2. The system of claim 1 further comprising a means for selectively controlling said rupturing along a length of said tubular member.

3. The system of claim 2 wherein said means for selectively controlling said rupturing further comprises a cut in an end of said tubular member.

4. The system of claim 3 wherein said cut has a length approximately twice as long as the wall thickness of said tubular member.

5. The system of claim 2 wherein said means for selectively controlling said rupturing further comprises a score in said tubular member.

6. The system of claim 5 wherein said score is in an end of said tubular member.

7. The system of claim 5 wherein the depth of said score is approximately 10% to approximately 20% the thickness of said tubular member.

8. The system of claim 1 wherein said tubular member is a generally rectangular tubular member having rounded interior corners.

9. The system of claim 1 wherein said lubricant is selected from the group consisting of zinc, oil, grease, paint, rust particles, and ceramic compositions.

10. The system of claim 1 further comprising a lubricant applied to an inner surface of said tubular member.

11. The system of claim 1 wherein said first mandrel has a tapering rectangular shape with bevels at each corner.

12. An energy absorption system comprising:
    an impact head;
    an energy absorption mechanism affixed to said head, said mechanism further comprising:
    a first generally rectangular mandrel; and
    a generally rectangular tubular member, said first generally rectangular mandrel receivable within a first end of said tubular member such that upon impact forces being applied to said impact head, said first mandrel is urged through said tubular member rupturing said tubular member, said rupturing controlling the dissipation of said impact forces.

13. The system of claim 12 further comprising a means for selectively controlling said rupturing along a length of said generally rectangular tubular member.

14. The system of claim 13 wherein said means for selectively controlling said rupturing is a cut in the center of a rounded interior corner of said tubular member.

15. The system of claim 13 wherein said cut has a length approximately twice as long the wall thickness of said tubular member.

16. The system of claim 12 wherein said means for selectively controlling said rupturing further comprises a score of said generally rectangular tubular member.

17. The system of claim 16 wherein said score is in an end of said tubular member.

18. The system of claim 16 wherein said score is further in the center of a rounded interior corner of said tubular member.

19. The system of claim 16 wherein the depth of said score is approximately 10% to approximately 20% the thickness of said tubular member.

* * * * *

UNITED STATES PATENT AND TRADEMARK OFFICE
CERTIFICATE OF CORRECTION

PATENT NO.   : 6,457,570 B2
DATED        : October 1, 2002
INVENTOR(S)  : Reid et al.

It is certified that error appears in the above-identified patent and that said Letters Patent is hereby corrected as shown below:

<u>Column 7,</u>
Lines 36-48, should read:
1. An energy absorption system comprising:
an impact head;
an energy absorption mechanism affixed to said head, said
   mechanism further comprising:
   a first mandrel; and
   a tubular member, said first mandrel receivable within
   a first end of said tubular member such that upon
   impact forces being applied to said impact head, said
   first mandrel is urged through said tubular member
   rupturing said tubular member, said rupturing
   controlling the dissipation of said impact
   forces.

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,457,570 B2
DATED : October 1, 2002
INVENTOR(S) : John D. Reid, John R. Rohde and Dean L. Sicking It is certified that error appears in the above-identified patent and that said Letters Patent is hereby corrected as shown below:

Column 1,
Line 9, after the text ending "filed Sep. 13, 2000," insert -- This invention was made in part during work supported by a grant/contract, Contract No. DTRS57-98-C-00079 from DOT/RSPA/Volpe National Transportation System Center. The government may have certain rights in this invention. --.

Signed and Sealed this

Thirty-first Day of January, 2006

JON W. DUDAS
*Director of the United States Patent and Trademark Office*